United States Patent [19]
Jakoby

[11] Patent Number: 5,823,038
[45] Date of Patent: Oct. 20, 1998

[54] APPARATUS FOR LOADING A BILLET AND, IF NECESSARY, A PRESSING DISC INTO A HORIZONTAL METAL EXTRUSION PRESS

[75] Inventor: Nikolaus Jakoby, Ratingen, Germany

[73] Assignee: SMS Eumuco GmbH, Germany

[21] Appl. No.: 800,850

[22] Filed: Feb. 14, 1997

[30] Foreign Application Priority Data

Feb. 26, 1996 [DE] Germany ................. 196 06 955.6

[51] Int. Cl.$^6$ ................................................. B21C 33/00
[52] U.S. Cl. ............................................................ 72/270
[58] Field of Search ...................... 72/270, 272, 273.5

[56] References Cited

FOREIGN PATENT DOCUMENTS

| | | |
|---|---|---|
| 0 074 549 A | 3/1983 | European Pat. Off. . |
| 0 267 112 A | 5/1988 | European Pat. Off. . |
| 0 428 989 A | 5/1991 | European Pat. Off. . |
| 2 681 055 A | 3/1993 | France . |
| 479 823 | 7/1929 | Germany . |
| 620 244 | 9/1935 | Germany . |
| 1 602 303 | 4/1970 | Germany . |
| 2 229 738 | 1/1974 | Germany . |
| 23 56 904 A3 | 5/1975 | Germany . |
| 92 14 125 U | 2/1993 | Germany . |

OTHER PUBLICATIONS

Hydraulische Pressen, Ernst Müller, Springer–Verlag, 1959, pp. 79–80.

Schloemann Rolling Mills·Hammers·Presses, Stahl und Eisen, 1962 No. 10, P2/129.

Indirect Extrusion of Copper–based Materials, A. Biswas and F.J. Zilges, Translation from Metall 29 (1975) 4, pp.375/380 (1–8).

14 000 ton Schloemann Extrusion Press, Schloemann Aktingesellschaft, Düsseldorf, Steinstrasse, Schloemannhaus, printed by Mohn & Co. GmbH, Jan., 1964, 6 pages.

*Primary Examiner*—Joseph J. Hail, III
*Assistant Examiner*—Ed Tolan
*Attorney, Agent, or Firm*—DeLio & Peterson, LLC

[57] ABSTRACT

To achieve the precise arrival of a carrying part at the required positions, despite the very high translatory or swivelling speed of the loading apparatus, it comprises a base translatory part, which is movable transversely to the press axis on a base guide, or a base swivelling part, which is swivellable in a plane transverse to the press axis about a base bearing, and a secondary translatory or swivelling part which is equipped with the carrying part and is movable on the base translatory or swivelling part. The translatory travel of the base translatory part or the swivelling angle of the base swivelling part, on the one hand, and the translatory travel of the secondary translatory part or the swivelling angle of the secondary swivelling part on the base translatory or swivelling part, on the other hand, correspond in each case to one of the travel or angular dimensions between the charging position and the intermediate station and between the intermediate station and the press axis. The base translatory or swivelling part and the secondary translatory or swivelling part are movable or simultaneously.

15 Claims, 5 Drawing Sheets

APPARATUS FOR LOADING A BILLET AND, IF NECESSARY, A PRESSING DISC INTO A HORIZONTAL METAL EXTRUSION PRESS

BACKGROUND OF THE INVENTION

The invention relates to apparatus for loading a billet and, if necessary, a pressing disc into a horizontal extrusion press. The axis of the extrusion press is perpendicular to a plane in which a translatory part (carriage, cradle, slide) is movable obliquely or horizontally or a swivelling part (swivelling arm) is swivellable. A carrying part (loading shell, pincers, sleeve), connected to the translatory part or swivelling part, can be brought from a charging position into an intermediate position or station, and further, into line with the press axis. In order to prevent trouble in the operating procedure, it is necessary for the carrying part to arrive precisely at the required positions. In order to minimise down-times arising in the course of the extrusion cycle, it is necessary to keep the time for the loading of a billet short, which requires, inter alia, rapid introduction and withdrawal of the translatory or swivelling part, with the carrying part connected to it. The stated requirements go against each other.

SUMMARY OF THE INVENTION

The object of the invention is to achieve precise arrival of the carrying part at the required positions despite the very high translatory or swivelling speed of the translatory or swivelling part connected to the carrying part. In accordance with the invention, the translatory or swivelling part of a loading apparatus is formed from a base translatory part which is movable transversely to the press axis on a base guide or from a base swivelling part which is swivellable in the plane transverse to the press axis about a base bearing and from a secondary translatory part or secondary swivelling part which is equipped with the carrying part and is movable on the base translatory part or base swivelling part, and in this arrangement the translatory travel of the base translatory part or the swivelling angle of the base swivelling part, on the one hand, and the translatory travel of the secondary translatory part or the swivelling angle of the secondary swivelling part on the base translatory part or base swivelling part, on the other hand, correspond in each case to one of the travel or angular dimensions between the charging position and the intermediate station and between the intermediate station and the press axis, and furthermore the base translatory part or swivelling part and the secondary translatory part or swivelling part are movable at staggered times or simultaneously.

The secondary translatory or swivelling part is provided particularly advantageously as the translatory or swivelling part with which the travel from the intermediate position into line with the press axis and back is executed, since the translatory or swivelling travel corresponding to the distance of the intermediate position from the press axis is, as a rule, shorter than the translatory or swivelling travel corresponding to the distance between the intermediate position and the charging position, added to which the lower mass of the secondary translatory or swivelling part contributes towards the minimisation of down-times. For a rapid moving-away procedure of the carrying part connected to the secondary translatory or swivelling part, which is particularly important, it is possible, in addition, to move the secondary translatory or swivelling part in the base translatory or swivelling part, and to move the latter part in the base guide or about the base bearing, together at the same time, so that the travelling or swivelling speeds are added to each other.

If the translatory or swivelling travel of the secondary translatory or swivelling part is less than that of the base translatory or swivelling part, a second intermediate position, located between a first intermediate position and the charging position, results, in that only the secondary translatory or swivelling part is moved towards the press axis, this second intermediate position being usable in particular for maintenance and inspection purposes outside the actual press cycle.

DETAILED DESCRIPTION OF PREFERRED EMBODIMENTS

Figure 1:
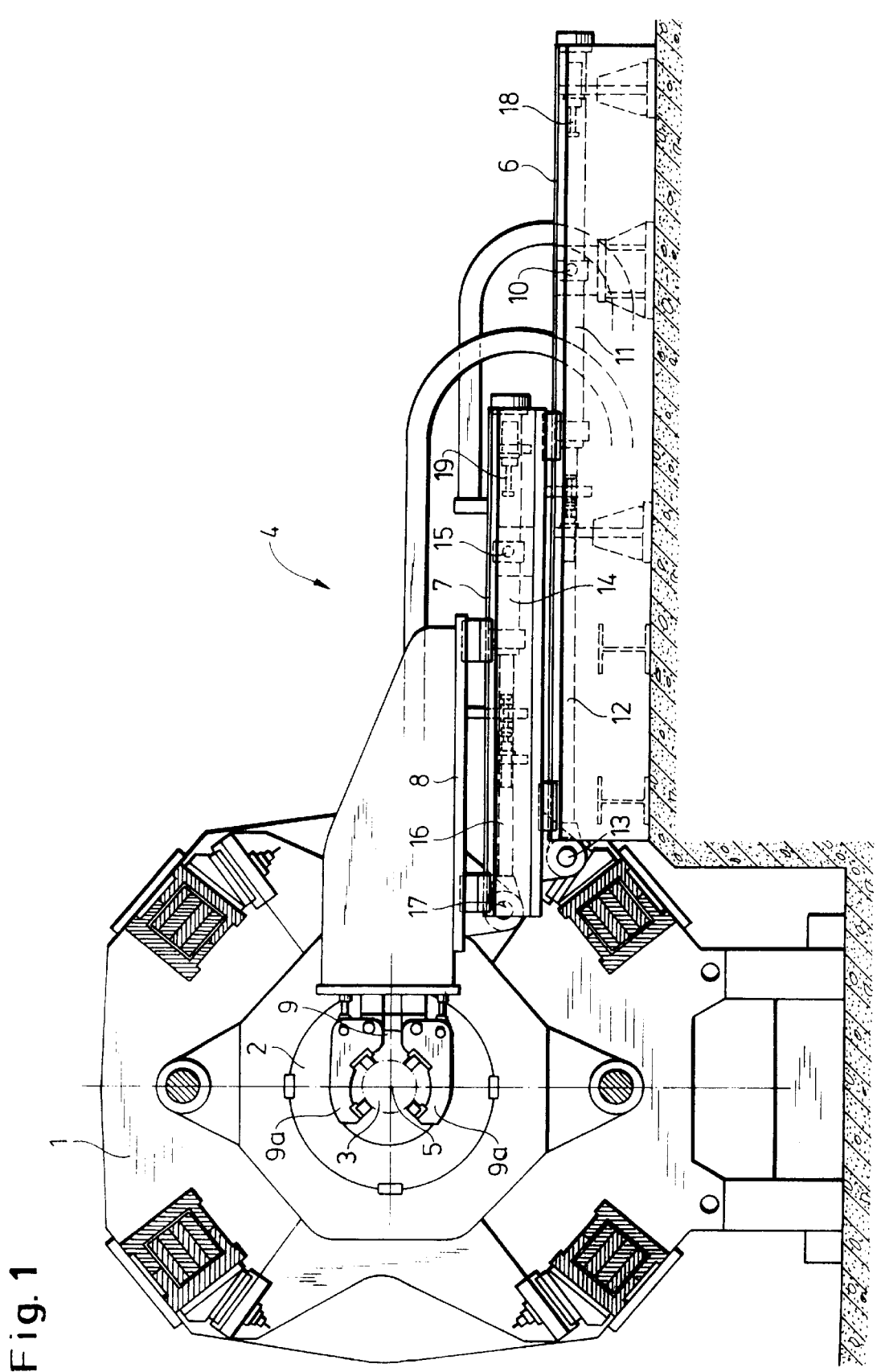
FIG. 1 shows extrusion press with loading apparatus in an embodiment with translatory parts, in a side view, in the position in which the carrying part has been brought into line with the press axis.
Figure 2:
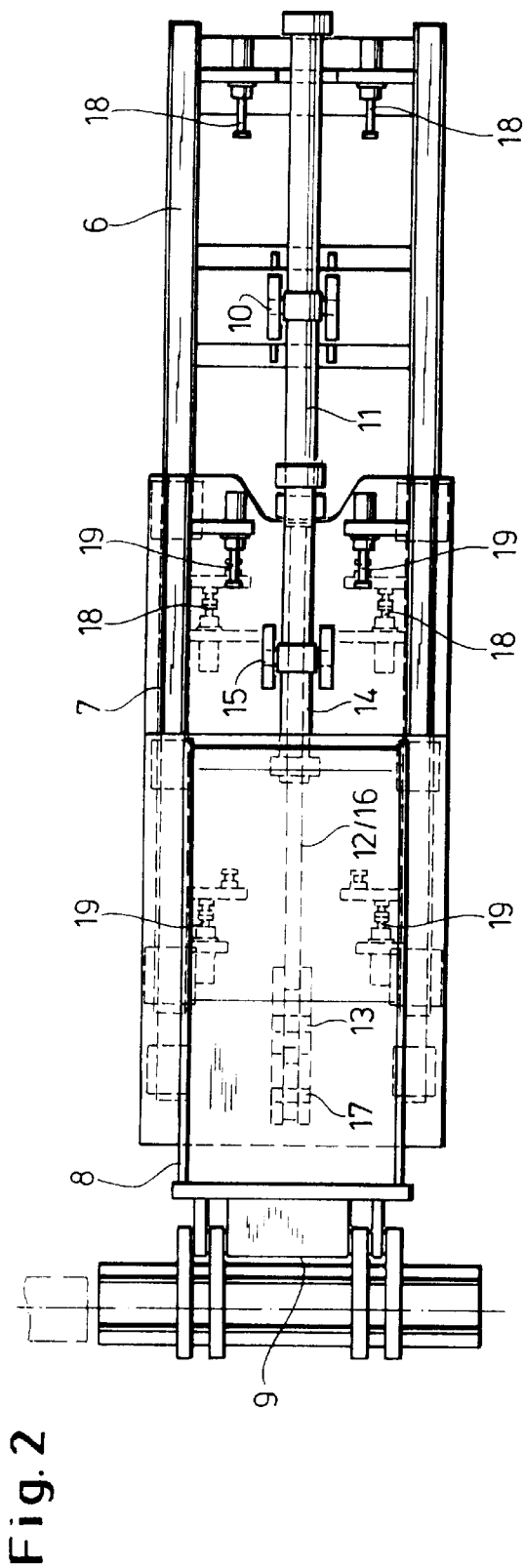
FIG. 2 shows a plan view of the loading apparatus.
Figure 3:
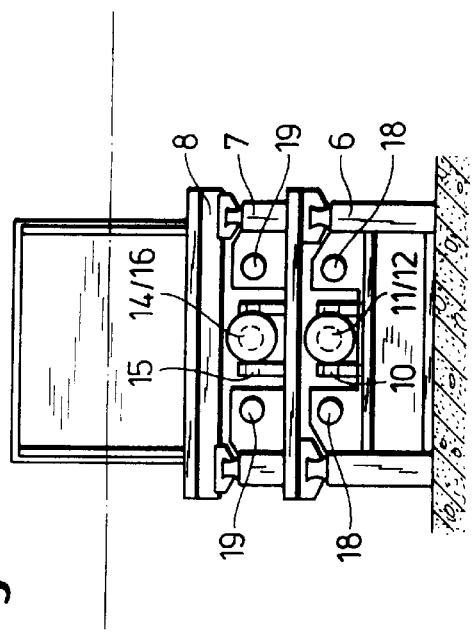
FIG. 3 shows an end view of the loading apparatus.

In FIG. 1 an extrusion press 1, is shown, having a container 2 into which a billet 3 is to be introduced and from which the billet is extruded. For this purpose, in the case of the exemplary embodiment illustrated in FIGS. 1 to 3, there is provided a loading apparatus 4 with first and second translatory parts 7 and 8 movable horizontally at right angles to the axis 5 of the extrusion press 1. A base translatory part 7 is movable horizontally on a base guide 6. A secondary translatory part 8 is guided, likewise so as to be movable horizontally, on the base translatory part 7 and is equipped, at its end facing the press axis 5, with a carrying part 9 constructed in the manner of pincers. In the position illustrated in FIG. 1, the carrying part 9, with the billet 3 which it is carrying, has been moved into line with the press axis 5, so that the billet 3 can be inserted into the bore of the container 2. As soon as the billet 3 has been inserted so far into the container 2 that it no longer requires any support by the carrying part 9, the carrying part 9 (in the exemplary embodiment, after the opening of the pincer arms 9a forming it) is moved away from the press axis 5 and the working region of the movable components of the extrusion press 1—such as the travelling path of the container 3—until it reaches the end position illustrated in FIG. 4, which at the same time forms the charging position, in which a following billet 3 coming from a furnace (not illustrated) is introduced into the carrying part 9. To minimise down-times of the extrusion process, the secondary translatory part 8 and the base translatory part 7 are moved simultaneously during the moving-away procedure (the former on the base translatory part 7 and the latter on the base guide 6), so that their travelling speeds are added to each other.

To displace the base translatory part 7 along the base guide 6, there is supported in the latter at a supporting point 10 the cylinder 11 of a piston/cylinder unit, the piston rod 12 of which is connected at 13 to the secondary translatory part 8. The cylinder 14 of a further piston/cylinder unit is supported at a supporting point 15 in the base translatory part 7 and the piston rod 16 of this piston/cylinder unit is connected to the secondary translatory part 8. The travelling path of the base translatory part 7 along the base guide 6 is limited by adjustable stops 18 and the travelling path of the secondary translatory part 8 along the base translatory part 7 is limited by adjustable stops 19.

Figure 4:
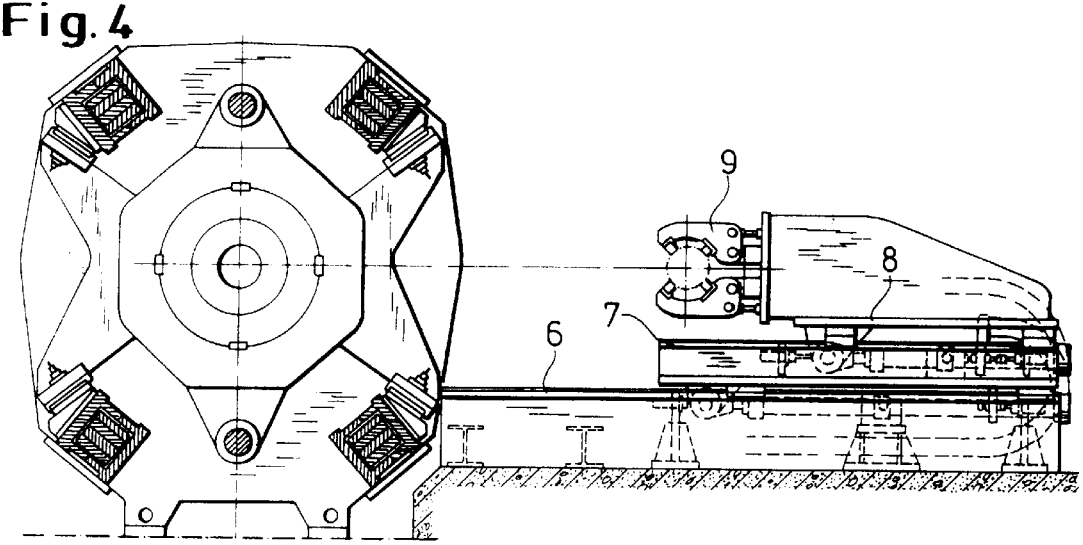
FIG. 4 is a side view (on a smaller scale) with the carrying part situated in the charging position.
Figure 5:
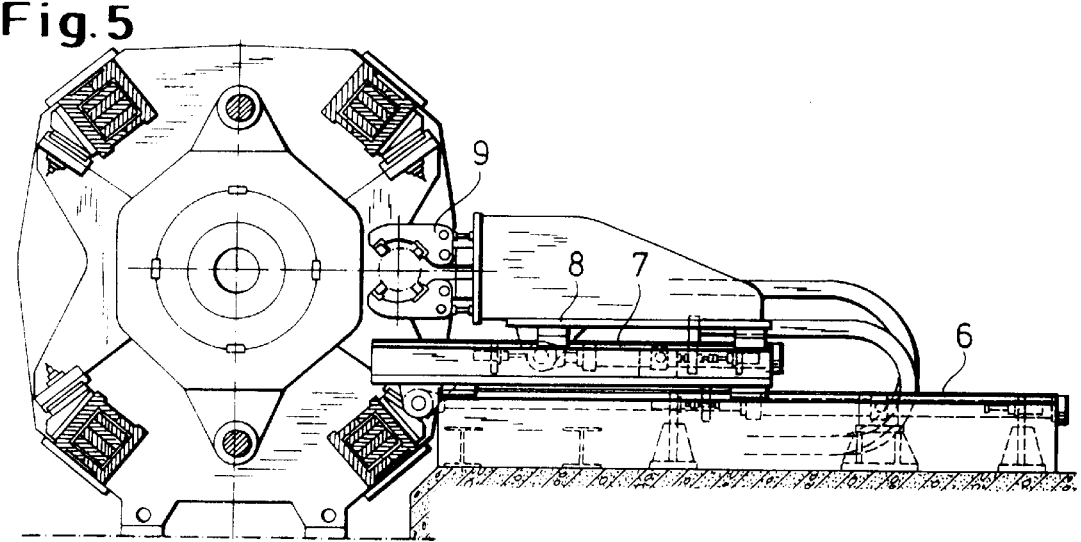
FIG. 5 is a side view with the carrying part situated in an intermediate position.

As soon as, in the charging position illustrated in FIG. 4, a new billet 3 for a subsequent extrusion operation has been loaded into the carrying part 9, the base translatory part 7 is moved towards the extrusion press 1 by means of the piston/cylinder unit 12/11 along the base guide 6 and in the process takes the secondary translatory part 8 with it, so that the carrying part 9 arrives at the intermediate position illustrated in FIG. 5, which is provided as a waiting position and/or for sooting of the billet end face, for inspection of the billet, for bringing into place of a pusher for the billet advance, for determination of the respective billet length and suchlike auxiliary operations. After completion of the preparatory operations, the secondary translatory part 8 is displaced towards the extrusion press 1 by means of the piston/cylinder unit 16/14 in the base translatory part 7 until it reaches the loading position illustrated in FIG. 1, in which the carrying part 9, with the new billet 3 which it is carrying, is situated in line with the press axis 5, so that a further extrusion operation can take place.

Figure 6:
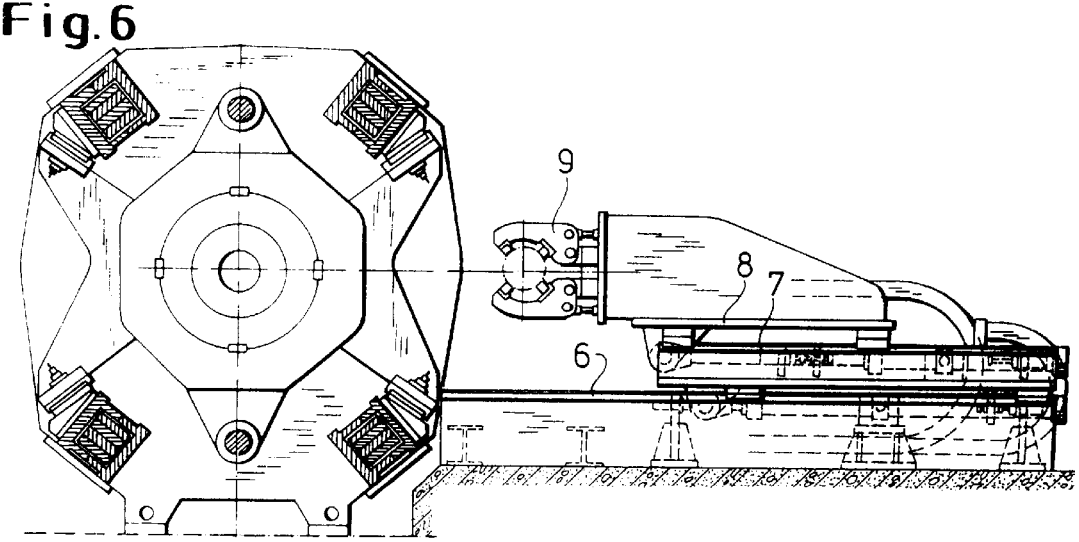
FIG. 6 is a side view with the carrying part situated in a further, second intermediate position.

Another intermediate position of the secondary translatory part 8 with the carrying part 9 is illustrated in FIG. 6. This intermediate position is reached in that the secondary translatory part 8 is displaced towards the extrusion press 1 along the base translatory part 7, while the base translatory part 7 remains in its most remote position from the extrusion press 1. In this intermediate position, inspection and maintenance work other than the aforementioned, which is necessary outside the usual press cycle, may be carried out.

Figure 7:
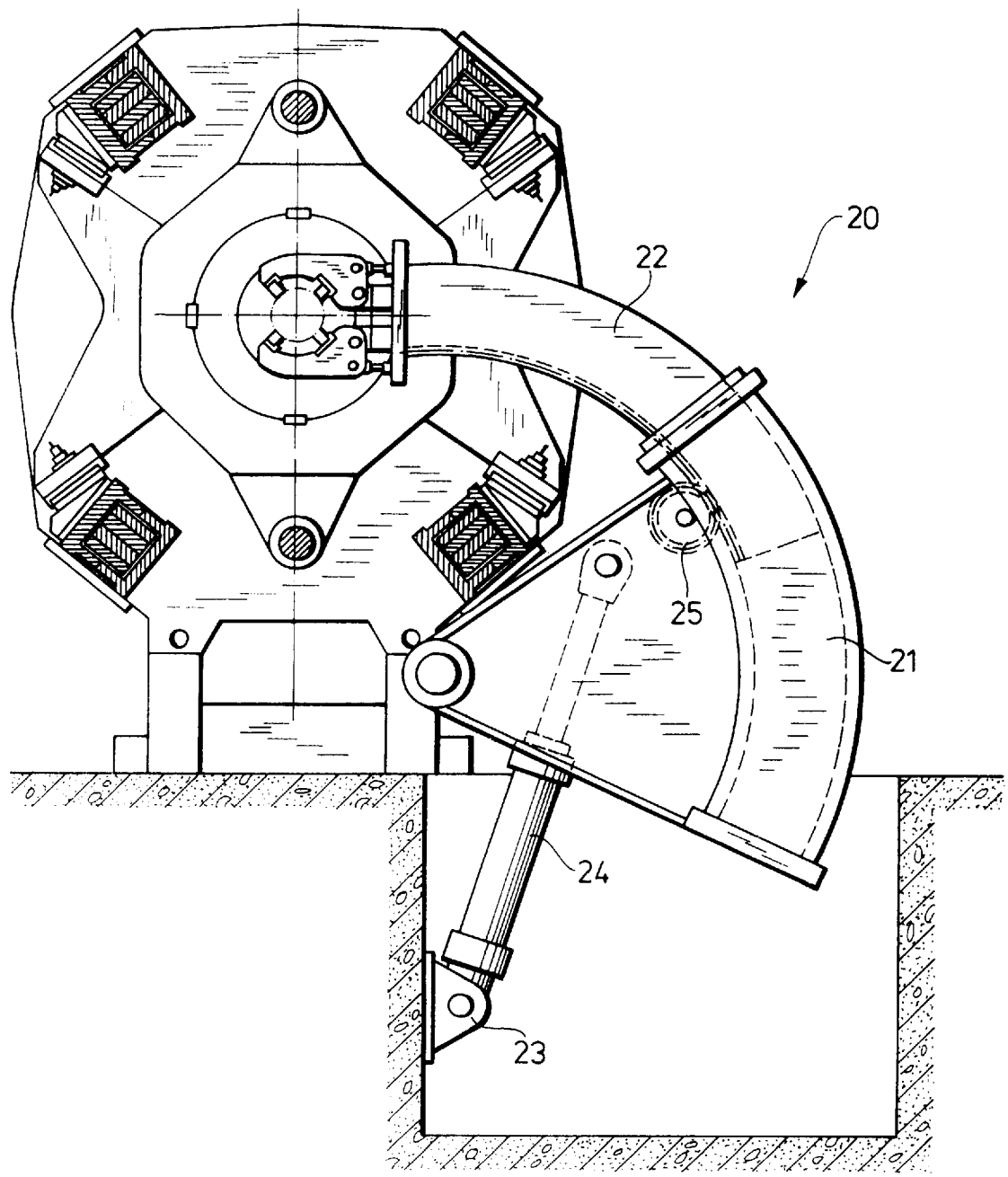
FIG. 7 shows a side view of an extrusion press with loading apparatus in an embodiment with swivelling parts, in the position in which the carrying part has been brought into line with the press axis.
Figure 8:
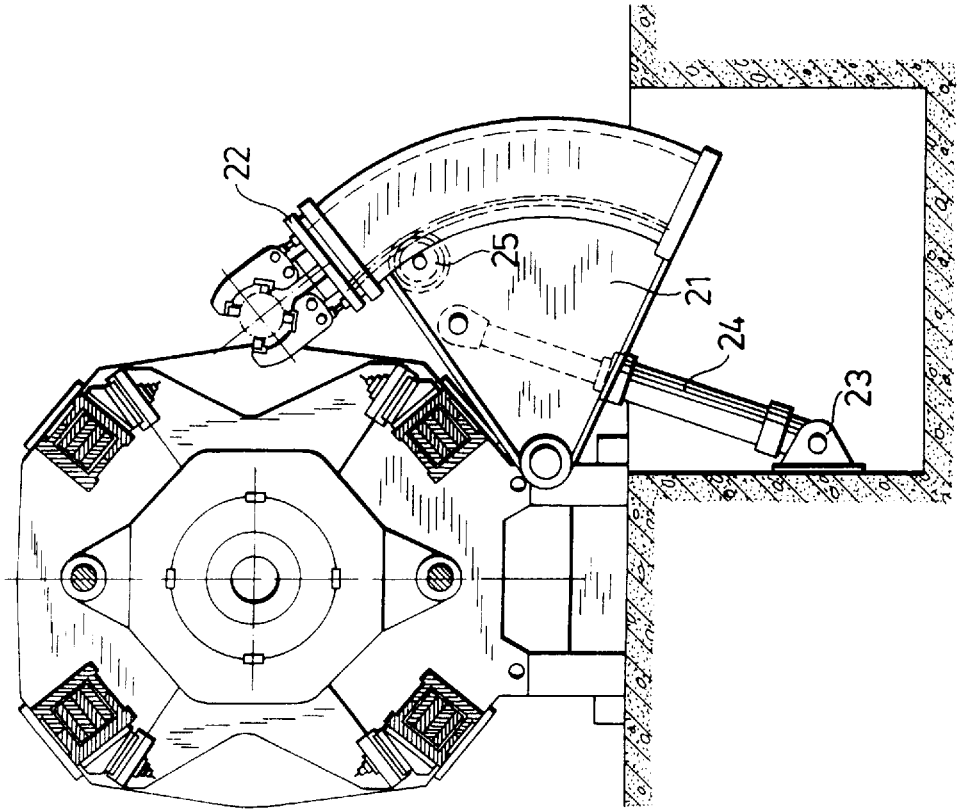
FIG. 8 is a side view (on a smaller scale) with the carrying part situated in the charging position.
Figure 9:
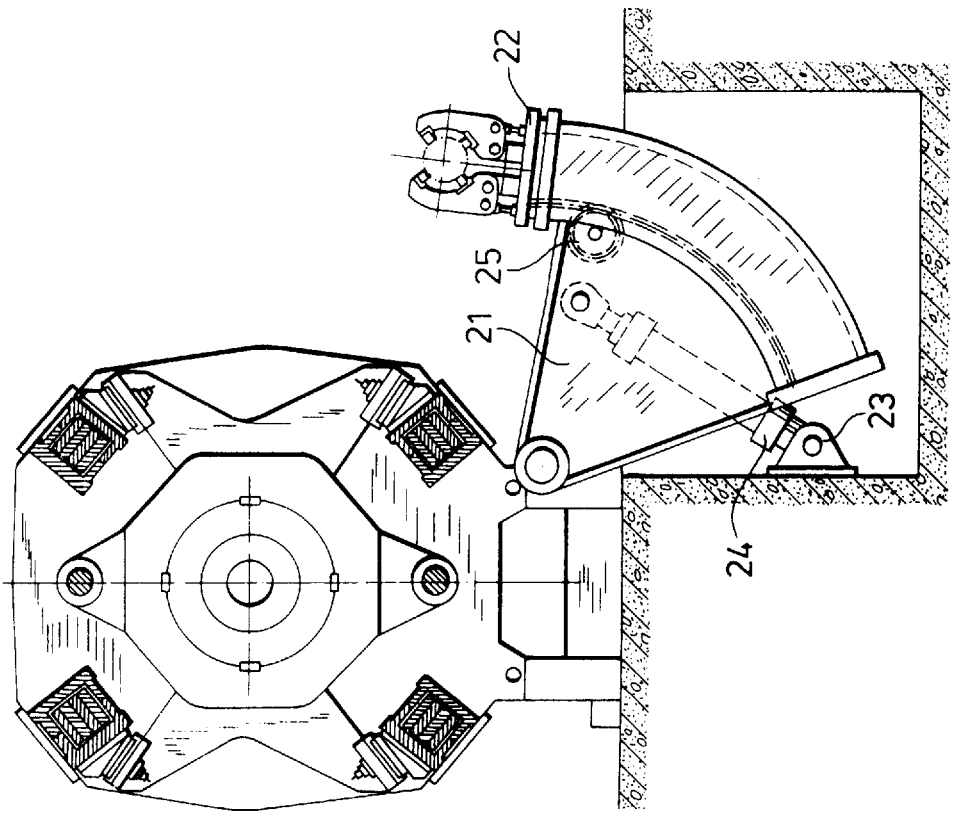
FIG. 9 is a side view with the carrying part situated in an intermediate position.

The exemplary embodiment illustrated in FIGS. 7 to 9 shows a loading apparatus 20 which comprises a base swivelling part 21, swivellable in a plane to which the press axis 5 is perpendicular, and a secondary swivelling part 22. The base swivelling part 21 can be swivelled about a base bearing 23 by means of a piston/cylinder unit 24. Guided in the base swivelling part 21 is the secondary swivelling part 22, which can be moved in the base swivelling part 21 by way of a pinion 25 driven by a motor and gearing (not illustrated).

The operating procedures in the two exemplary embodiments correspond to each other, with the loading positions of FIG. 1 and FIG. 7, the charging position of FIG. 4 and FIG. 8, and the intermediate position of FIG. 5 and FIG. 9 corresponding to each other.

I claim:

1. Apparatus for loading a billet and, if necessary, a pressing disc into a horizontal metal extrusion press having a press axis, the apparatus comprising:
    a base;
    a first mobile part mounted on said base so as to be movable relative thereto in a plane transverse to said press axis, the extent of the movement being predetermined;
    a second mobile part mounted on said first mobile part so as to be movable relative thereto in said plane, the extent of the movement being predetermined; and
    a carrying part provided on said second mobile part;
    whereby the carrying part is movable in said plane from a charging position remote from said press axis, via an intermediate position, to a loading position in line with said press axis; and
    wherein the extent of movement of one of said mobile parts corresponds to the distance between the charging position and the intermediate position, and the extent of movement of the other of said mobile parts corresponds to the distance between the intermediate position and the loading position.

2. Apparatus according to claim 1, wherein said one mobile part is said first mobile part.

3. Apparatus according to claim 2, wherein the extent of movement of said second mobile part is less than the extent of movement of said first mobile part.

4. Apparatus according to claim 1, wherein said mobile parts are movable selectively separately and simultaneously.

5. Apparatus according to claim 1, wherein at least one of said mobile parts is movable translatorily.

6. Apparatus according to claim 1, wherein at least one of said mobile parts is movable swivellingly.

7. Apparatus for loading a billet and, if necessary, a pressing disc into a horizontal metal extrusion press having a press axis, the apparatus comprising a carrying part which is movable in a plane transverse to said press axis from a charging position, via an intermediate position, to a loading position in line with said press axis, a base, a first translatory or swivelling part which is movable on the base in the plane transverse to the press axis, and a second translatory or swivelling part which is equipped with said carrying part and is movable on said first translatory or swivelling part, wherein the extent of the translation or swivelling of said first part and the extent of the translation or swivelling of said second part on said first part correspond respectively to a distance between the charging position and the intermediate position and between the intermediate position and the press axis, and wherein said first translatory or swivelling part and said second translatory or swivelling part are movable separately or simultaneously.

8. Apparatus according to claim 7, wherein the extent of travel of the first translatory or swivelling part is provided for travel of the carrying part between the charging position and the intermediate position, and the extent of travel of the second translatory or swivelling part on the first part is provided for travel of the carrying part between the intermediate position and the loading position.

9. Apparatus according to claim 8, wherein the extent of travel of the second translatory or swivelling part is less than that of the first translatory or swivelling part.

10. Apparatus for loading a billet and, if necessary, a pressing disc into a horizontal metal extrusion press having a press axis, the apparatus comprising:
    a base;
    a first mobile part mounted on said base so as to be movable relative thereto in a plane transverse to said press axis, the extent of the movement being predetermined;
    a second mobile part mounted on said first mobile part so as to be movable relative thereto in said plane, the extent of the movement being predetermined; and
    a carrying part provided on said second mobile part;
    whereby the carrying part is movable in said plane from a charging position remote from said press axis, via an intermediate position wherein the carrying part is closer to said press axis than in the charging position but still remote from said press axis, to a loading position wherein the carrying part is in line with said press axis; and wherein the extent of movement of one of said mobile parts corresponds to the distance between the charging position and the intermediate position, and the extent of movement of the other of said mobile parts corresponds to the distance between the intermediate position and the loading position.

11. Apparatus according to claim 10 wherein said one mobile part is said first mobile part.

12. Apparatus according to claim 11 wherein the extent of movement of said second mobile part is less than the extent of movement of said first mobile part.

13. Apparatus according to claim 10 wherein said mobile parts are movable selectively separately and simultaneously.

14. Apparatus according to claim 10 wherein at least one of said mobile parts is movable translatorily.

15. Apparatus according to claim 10 wherein at least one said mobile parts is movable swivellingly.

* * * * *